United States Patent
Lambert et al.

(10) Patent No.: US 9,467,368 B2
(45) Date of Patent: Oct. 11, 2016

(54) SYSTEM AND METHOD FOR ROUTING DATA TO DEVICES WITHIN AN INFORMATION HANDLING SYSTEM

(71) Applicant: Dell Products, LP, Round Rock, TX (US)

(72) Inventors: Timothy M. Lambert, Austin, TX (US); Shawn J. Dube, Austin, TX (US); Wade A. Butcher, Cedar Park, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 482 days.

(21) Appl. No.: 13/784,047

(22) Filed: Mar. 4, 2013

(65) Prior Publication Data

US 2014/0250239 A1  Sep. 4, 2014

(51) Int. Cl.
| | | |
|---|---|---|
| G06F 15/173 | (2006.01) | |
| H04L 12/741 | (2013.01) | |
| H04W 40/00 | (2009.01) | |
| H04L 12/771 | (2013.01) | |
| H04L 12/46 | (2006.01) | |
| H04L 12/701 | (2013.01) | |
| H04L 12/801 | (2013.01) | |
| H04L 12/773 | (2013.01) | |

(52) U.S. Cl.
CPC ........... H04L 45/54 (2013.01); H04L 12/4641 (2013.01); H04L 45/00 (2013.01); H04L 45/56 (2013.01); H04L 47/13 (2013.01); H04W 40/00 (2013.01); H04L 45/60 (2013.01)

(58) Field of Classification Search
CPC ..... H04L 45/58; H04L 45/70; H04L 47/125; H04L 45/54; H04L 45/60; H04L 47/13; H04L 45/00; H04L 45/56; H04L 12/4641; G06F 15/16; G06T 1/20; H04W 40/00
See application file for complete search history.

(56) References Cited

U.S. PATENT DOCUMENTS

| | | | |
|---|---|---|---|
| 5,978,389 A | 11/1999 | Chen | |
| 6,040,981 A | 3/2000 | Schmitt et al. | |
| 6,961,575 B2* | 11/2005 | Stanforth | 455/445 |
| 7,340,535 B1* | 3/2008 | Alam | 709/246 |
| 7,751,360 B2* | 7/2010 | Yagyu et al. | 370/328 |
| 8,990,470 B1* | 3/2015 | Sala et al. | 710/305 |
| 2003/0142683 A1* | 7/2003 | Lam | H04L 12/2898 370/401 |
| 2007/0110017 A1* | 5/2007 | Fulknier | H04L 45/00 370/338 |
| 2009/0265045 A1 | 10/2009 | Coxe, III | |
| 2009/0323723 A1* | 12/2009 | Tominaga | 370/474 |
| 2013/0086398 A1* | 4/2013 | Khor | G06F 15/7825 713/300 |
| 2014/0192675 A1* | 7/2014 | Perez | H04L 45/28 370/254 |

\* cited by examiner

*Primary Examiner* — Chirag R Patel
(74) *Attorney, Agent, or Firm* — Larson Newman, LLP (57) ABSTRACT

An information handling system includes a management controller and a router. The management controller includes a universal serial bus hub and first and second devices. The management controller to assign the first device to a first server node, to assign the second device to a second server node, and to create a routing table associated with the assignment of the first and second devices respectively to the first and second server nodes. The router is in communication with the management controller. The router to receive the routing table from the management controller, to receive data from the first server node, and to route the data to the first device based on the routing table. The universal serial bus hub communicates with the router via a single physical port of the management controller.

20 Claims, 5 Drawing Sheets

SYSTEM AND METHOD FOR ROUTING DATA TO DEVICES WITHIN AN INFORMATION HANDLING SYSTEM

FIELD OF THE DISCLOSURE

This disclosure generally relates to information handling systems, and more particularly relates to a system and method for routing data to devices within an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems. An information handling system, such as a server, can have multiple nodes or processors that can communicate with multiple devices of the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
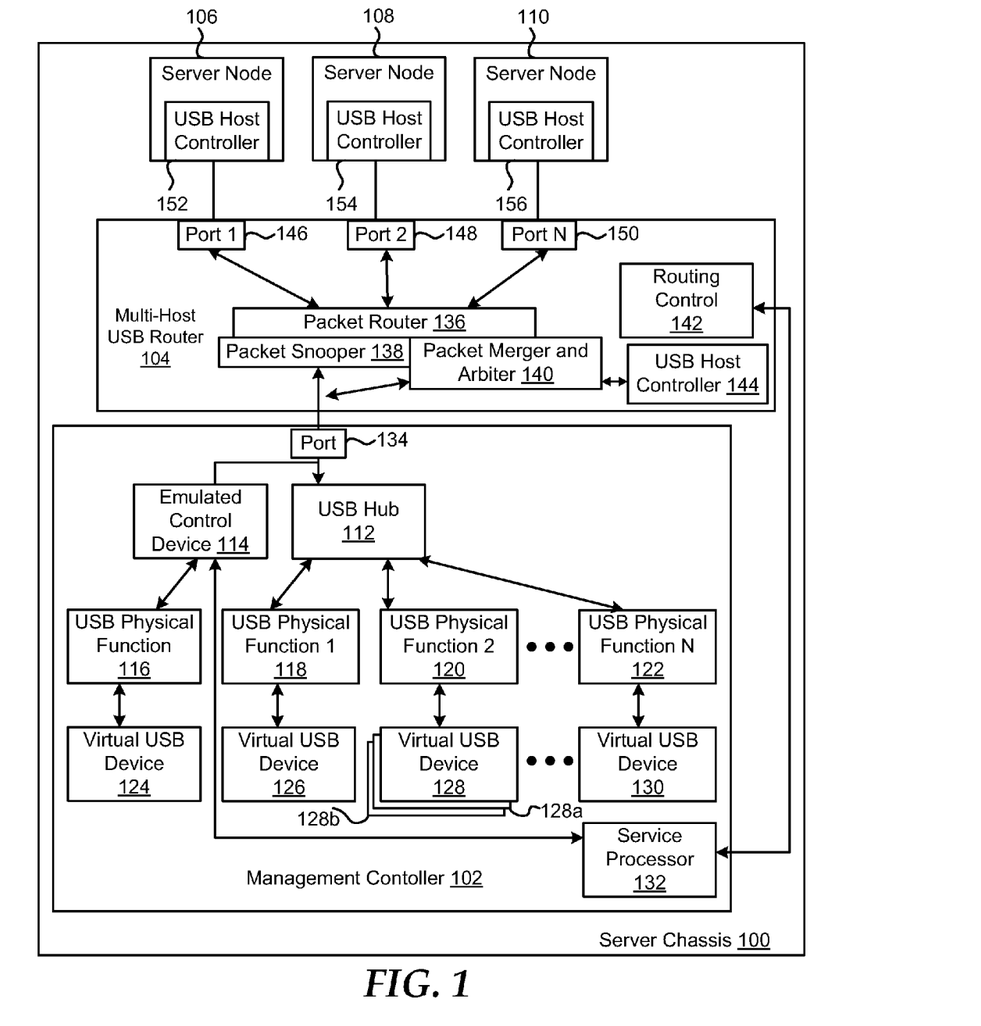
FIG. 1 is a block diagram of a server chassis.

FIG. 1 illustrates a server chassis 100 including servers, devices, and/or information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The server chassis 100 includes a management controller 102, a multi-host universal serial bus (USB) router 104, and server nodes 106, 108, and 110. The management controller 102 includes a USB hub 112, an emulated control device 114, USB physical functions 116, 118, 120, and 122, virtual USB devices 124, 126, 128, and 130, a service processor 132, and a communication port 134. The multi-host USB router 104 includes a packet router 136, a packet snooper 138, a packet merger and arbiter 140, a routing control module 142, a USB host controller 144, and host communication ports 146, 148, and 150. The server nodes 106, 108, and 110 each include a respective USB host controller 152, 154, and 156. The USB hub 112 is in communication with the USB functions 118, 120, and 122, which in turn are in communication with the virtual USB devices 126, 128, and 130. In an embodiment, a single USB function, such as the USB function 120, can communicate with multiple virtual USB devices. For example, the USB function 120 can communicate with virtual USB devices 128, 128a, and 128b. The USB hub 112 is also in communication with the packet router 136, the packet snooper 138, and the packet merger and arbiter 140 of the multi-host USB router 104.

The emulated control device 114 is in communication with the USB function 116, which in turn is in communication with the virtual USB device 124. The emulated control device 114 is also in communication with the service processor 132, the packet router 136, the packet snooper 138, and the packet merger and arbiter 140. The packet router 136 is in communication with the USB host controller 144. In an embodiment, the USB host controller 144 can be a virtual host controller within the multi-host USB router 104. The packet router 136 is in communication with the USB host controllers 152, 154, and 156 of the server nodes 106, 108, and 110. The service processor 132 is in communication with the multi-host USB router 104 via a sideband communication channel, such as an inter-integrated (I2C) channel. In different embodiments, the management controller 102 can be any type of controller for the server chassis 100, such as an interactive Dell Remote Access controller or the like.

In an embodiment, the server chassis 100 can be a single server with multiple processors, such that each server node 106, 108, and 110 is a different processor within the server, and the management controller 102 can be utilized to establish different virtual connections between the server nodes and the USB devices 126, 128, and 130. In another embodiment, the server chassis 100 can be a server rack and each server node 106, 108, and 110 can be a server that includes multiple processors. In both embodiments, each of the different server nodes 106, 108, and 110 only are aware of/recognize the USB hub 112 to utilize in communicating with the USB functions 118, 120, and 122 and the virtual USB devices 126, 128, and 130. Thus, the USB packets can be streamed from the management controller 102 to the USB router 104 via the single USB bus 112 and the port 134, and then the multi-host USB router 104 can route individual packets to each of the server nodes 106, 108, and 110.

The virtual USB devices 126, 128, and 130 can be virtual USB keyboard video mouse (KVM) devices, virtual USB mass storage devices, virtual compact disk (CD), and/or virtual controller functions for the server nodes 106, 108, and 110. The management controller 102 can dynamically assigned the different virtual USB devices 126, 128, and 130 to the server nodes 106, 108, and 110 by creating a routing table 200 as shown in FIG. 2.

Figure 2:
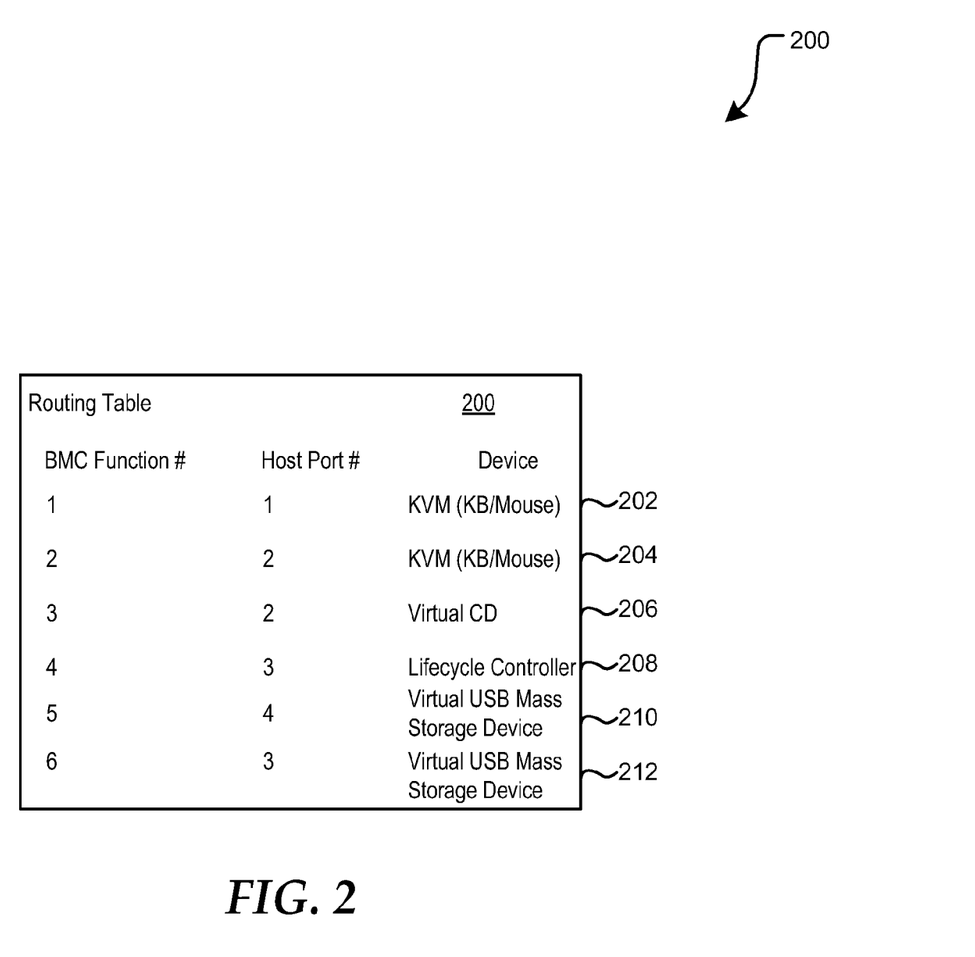
FIG. 2 is an exemplary routing table for the server chassis.

FIG. 2 shows the routing table 200 including entries 202, 204, 206, 208, 210, and 212 (202-212). In an embodiment, the assignment of the USB host controller 152, 154, and 156 within the routing table 200 can be based on the port that the multi-host USB router 104 is connected. The routing table 200 can indicate the USB function, the multi-host USB router port, and the type of USB device for each entry. For example, entry 202 indicates that a first function, such as USB function 116, is assigned to a first host port 146, and that the USB device is a virtual KVM. The entry 204 indicates that a second function, such as USB function 118, is assigned to a second host port 148, and that the USB device is a virtual KVM. The entry 206 indicates that a third function is assigned to the second host port, and that the USB device is a virtual CD. The entry 208 indicates that a fourth function is assigned to a third host port, and that the USB device is a lifecycle controller. The entry 210 indicates that a fifth function is assigned to a fourth host port, and that the USB device is a virtual USB mass storage device. The entry 212 indicates that a sixth function, such as USB function 120, is assigned to the third host port, and that the USB device is a virtual USB mass storage device. The number of USB functions and USB devices within the management controller 102 can vary as devices are added or removed from the management controller. Thus, the management controller 102 can dynamically adjust the routing table 200 in response to the addition or removal of virtual USB devices, and/or based on current virtual USB devices being assigned to different USB host controllers.

Referring back to FIG. 1, the assignment of a virtual USB device 126, 128, or 130 to a particular server node 106, 108, or 110 can occur as a result of a command received by the service processor 132 from a remote user. For example, the remote user can communicate with the service processor 132 to request that a virtual KVM device be assigned to the USB host controller 152. In this example, the service processor 132 can create the entry 202 within the routing table 200, and the entry can assign the USB device 126 connected to the USB function 118 to the USB host controller 152 that is connected to the first host port 146 of the multi-host USB router 104.

The remote user can also access the service processor 132 to assign other virtual USB devices in the management controller 102 as virtual devices for the USB host controllers 152, 154, and 156. In an embodiment, the virtual USB devices 126, 128, and 130 are virtual devices of the USB host controllers 152, 154, and 156, because the virtual USB devices can be dynamically assign to any one of the USB host controllers and are only a recognized device to the USB host controllers when the virtual USB device is assigned to that particular USB host controller. The service processor 132 can then send the routing table 200 to the routing control module 142 of the multi-host USB router 104.

The assignment of a virtual USB device 126, 128, or 130 to a particular server node 106, 108, or 110 can also occur as a result of a command from the USB host controller 152, 154, or 156 over a low-pin count (LPC) bus between the USB host controller and the management controller 102. For example, the USB host controller 154 can transmit a LPC bus command to the service processor 132 of the management controller 102, and the LPC bus command can be a request to access a virtual USB mass storage device within the management controller, such as a virtual USB mass storage device on a replaceable media connected to the USB function 122. The management controller 102 can receive the LPC bus command and then create the entry 210 in the routing table 200 assigning the virtual USB device 130 to host port four 150, which in turn is connected to the USB host controller 156. The service processor 132 can then send the updated routing table 200 to the routing control module 142 of the multi-host USB router 104. In an embodiment, the service processor 132 can also receive a request for a USB device 126, 128, or 130 as an intelligent platform management interface (IPMI) command from one of the USB host controllers 152, 154, and 156. The service processor 132 can handle the IPMI command in a substantially similar fashion as the LPC bus command described above.

The routing control module 142 can receive the routing table 200 from service processor 132 of the management controller 102, and can store the routing table in a memory of the multi-host USB router 104. The packet router 136 can utilize the routing control module 142 to determine a particular USB function associated with a northbound packet, and to determine a port to transmit the northbound packet. The packet router 136, the packet snooper 138, and the packet merger and arbiter 140 can be utilized in the multi-host USB router 104 to transfer the USB packets to the proper USB host controller 152, 154, or 156, and to send USB packets to the USB hub 112.

For example, the multi-host USB router 104 can receive a packet from the USB function 120. The packet snooper 138 can snoop the packet, such as a field in the header of the packet, to determine the USB function that is the source of the packet. The routing control module 142 can then access the routing table 200 and determine the port of the multi-host USB router 104 associated with the particular USB function. For example, if the packet is from the USB function 120, the routing table 200 can indicate that the second port is associated with that particular USB function. The packet router 136 can then transmit the packet to the USB host controller 154 via the second port 148 of the multi-host USB router 104.

When the multi-host USB router 104 receives a USB packet from a USB host controller 152, 154, or 156, the packet merger and arbiter 140 can place or merge the USB packet into a single USB data stream that can include packets from other USB host controllers, and can provide the USB data stream to the USB hub 112, which in turn can route the USB packet to the proper USB function 118, 120, or 122. For example, the multi-host USB router 104 can receive a USB packet from the USB host controller 152, and can receive a USB packet from the USB host controller 154. The packet merger and arbiter 140 can then merge the two USB packets into a single data stream to be provided to the USB hub 112. When the USB hub 112 receives the USB packets in the data stream, the USB hub 112 can determine that one of the packets is associated with USB function 118 and the USB device 126, and can determine that the other packet is associated with the USB function 120 and USB device 128. The USB hub 112 can then send the packets to the USB devices 126 and 128 via the respective USB functions 118 and 120.

The packet merger and arbiter 140 can utilize a time division algorithm while placing the packets from the different host controllers 152, 154, and 156 into the data stream for the USB hub 112. The time division algorithm can enable the multi-host USB router 104 to evenly distribute the packets from the different USB host controllers 152, 154, and 156 within the data stream. The multi-host USB router 104 can also determine whether a number of packets received from a particular USB host controller 152, 154, or 156 during a particular time period has exceeded a threshold number of packets. If the number of packets received from the particular USB host controller 152, 154, or 156 during the particular time period has exceeded the threshold number of packets, the multi-host USB router 104 can send a hold packet to the particular USB host controller to cause the USB host controller to stop transmitting packets for a particular amount of time.

For example, if the USB host controller 156 is performing a bulk data transfer to the virtual USB device 130, the USB host controller can send more than the threshold number of packets during a particular time period, such that the USB host controller is using all or most of the available bandwidth to the USB hub 112. The multi-host USB router 104 can then send the hold packet to the USB host controller 156 to temporarily stop the USB host controller from transmitting packets so that the other USB host controllers 152 and 154 may utilize some of the bandwidth to send packets to the virtual USB devices of the management controller 102.

In an embodiment, the packet router 136 may utilize a round-robin algorithm when transmitting packets associated with multiple KVM devices. For example, if each of the virtual USB devices 126, 128, and 130 are KVM devices that are all sending packets to the USB host controllers 152, 154, and 156 at substantially the same time, the packet router 136 can transmit one packet from each device before transmitting a second packet from one of the devices. Thus, each KVM can have even use of the bandwidth to communicate with the USB host controllers 152, 154, and 156.

In an embodiment, the routing control module 142 can include the USB host controller 144. The routing control module 142 can utilize an in-band control channel along with a USB control function, such as serial port on the management controller 102, to communicate with the management controller. In this embodiment, the routing control module 142 can scan the management controller 102 for the emulated control device 114 that is in communication with the USB function 116 and with the service processor 132. In this embodiment, the USB function 116 can be dedicated to creating the routing table, such that the virtual USB device 124 is not accessible to the server nodes 106, 108, and 110 but utilized by the service processor 132 of the management controller 102 to create the routing table. When a new USB device is added to the management controller 102, the emulated control device 124 and the USB host controller 144 communicate determine information about the new USB device, such as whether the new USB device is a virtual KVM, a virtual USB mass storage device on a replaceable media, or the like. The USB host controller 144 and the emulated control device 114 can assign the new virtual USB device and the associated USB function to a host port of the multi-host USB router 104. The assignments can then be sent to the service processor 132 to update the routing table. The service processor 132 can then send the updated routing table to the routing control module 142 via the emulated control device 114 and the communication port 134.

Figure 3:
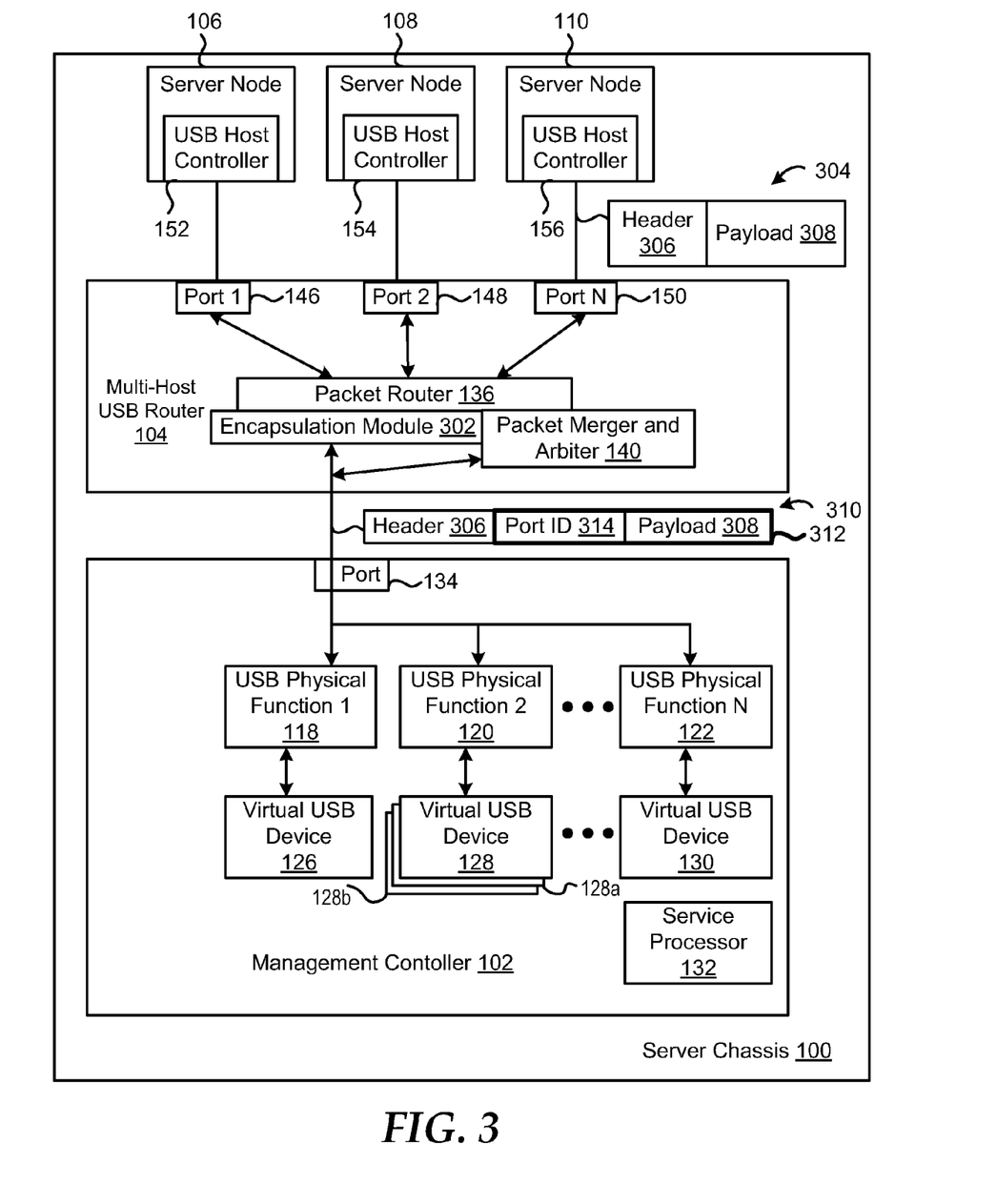
FIG. 3 is a block diagram of another embodiment of the server chassis.

FIG. 3 shows another embodiment of the server chassis 100. In this embodiment, the USB function 116 and the virtual USB device 124 can be removed from the management controller 102, and the routing control module 142 and the USB host controller 144 can be removed from the multi-host USB router 104. In this embodiment, the USB hub 112 can be removed or can be included in the management controller 102. For simplicity, the USB hub 112 has not been shown in FIG. 3. Also, the packet snooper 128 can be replaced with an encapsulation module 302. The USB host controllers 152, 154, and 156 in the server nodes 106, 108, and 110 can communicate with the different virtual USB devices 126, 128, 128a, 128b, and 130 within the management controller 102.

In this embodiment, a USB host controller, such as the USB host controller 156, can transmit a packet 304 to a USB function and virtual USB device, such as the USB function 122 and the virtual USB device 130. The packet 304 can include a header 306 and a payload 308. The header 306 can include information to identify the USB function 122 as a destination for the packet 304, and the payload 308 can include the data for the virtual USB devices 130. When the packet 304 is received at the multi-host USB router 104 via the host port 150, the packet router 136 can determine the host port that the packet was received. The packet router can then send the packet 304 to the encapsulation module 302 along with information identifying the source port for the packet. The encapsulation module 302 can then create a new packet 310 including the header 306 from the packet 304, and a new payload 312, which can include the port identification information 314 along with the original payload 308.

The packet merger and arbiter 140 can then place or merge the new USB packet 310 into a single USB data stream that can include packets from other USB host controllers, and can provide the USB data stream to the management controller 102 via the port 134. When the packet 310 is received at the port 134, the packet can be provided to the USB function 122 based on information in the header 306 identifying the destination USB function. The service processor 132 can then send data back to the USB host controller 156.

In this situation, the service processor 132 of the management controller 102 can create the packet 310 to send data from the USB function 122 to the USB host controller 156. The packet 310 can be created with the header 306 and the payload 312, which can include a destination port identification 314 and the payload data 308. The destination port identification 314 can be generated based on the source port identification received in the management controller 102 when a corresponding packet was sent to the USB function 122. When the packet 310 is received in the multi-host USB router 104, the encapsulation module 302 can deconstruct the packet 310 and create the packet 304, which can include the header 306 and the payload 308 that was embedded within the payload 312 of the packet 310. The encapsulation module 302 can then provide the packet 304 to the packet router 136 with information identifying the destination port 150. The packet router 136 can use destination port information to route the packet 304 to the USB host controller 156 via the host port 150. Thus, in this embodiment the multi-host USB router 104 can route packets between the USB host controllers 152, 154, and 156 and the management controller 102 via a single USB bus connecting the multi-host USB router and the management controller without the use of a routing table.

Figure 4:
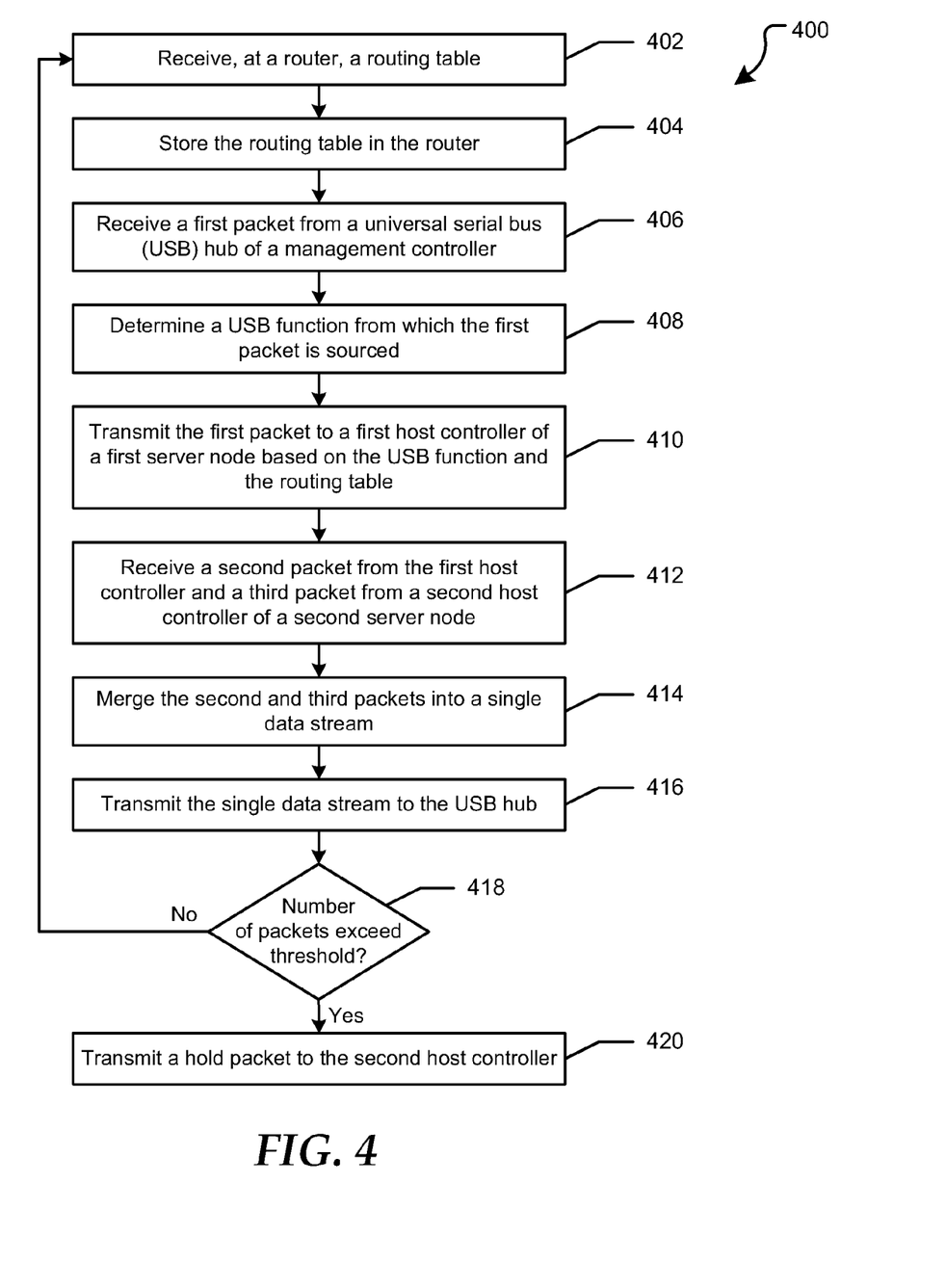
FIG. 4 is a flow diagram of a method for routing data packets between a universal serial bus hub and server nodes of the server chassis.

FIG. 4 shows a method 400 for routing data packets between the USB hub 112 and the server nodes 106, 108, and 110 of FIG. 1. At block 402, a routing table is received at a router from a management controller. The routing table can identify different USB endpoint devices that are assigned or associated with different USB host controller of server nodes. The routing table is stored in the router at block 404. In an embodiment, the routing table can be received from the management controller via a sideband channel, such as an inter-integrated circuit (I2C) channel. At block 406, a first packet is received from a USB hub of the management controller. In an embodiment, the router is in communication with the USB hub via a single physical port of the management controller. A USB function from which the first packet is sourced is determined at block 408. At block 410, the first packet is transmitted to a first host controller of a first server node based on the USB function from which the packet is sourced and based on the routing table.

At block 412, a second packet is received from the first host controller of the first server node and a third packet is received from a second host controller of a second server node. The second and third packets are merged into a single stream at block 414. In an embodiment, the second and third packets can be merged into the single stream based on a time division algorithm. At block 416, the single stream is transmitted to the USB hub. A determination is made whether the second host controller is transmitting more than a threshold number of packet during a specific period of time at block 418. If the number of packets transmitted by the second host controller during the specific period of time exceeds the threshold number of packets, a hold packet is transmitted to the second host controller of the second server node at block 420. The hold packet can ensure that the second host controller does not utilize all of the available bandwidth on the universal serial bus between the router and the USB hub. If the number of packets transmitted by the second host controller during the specific period of time does not exceed the threshold number of packets, the flow continues as stated above at block 402.

Figure 5:
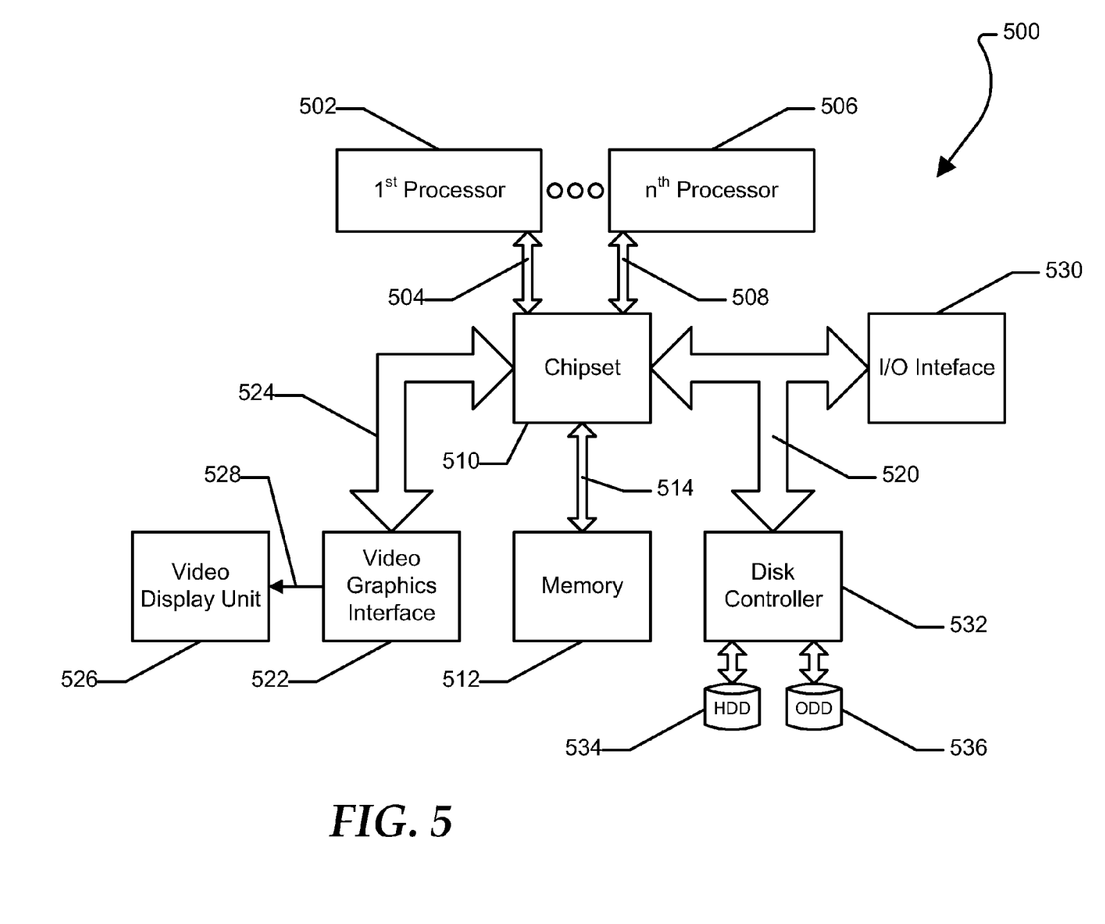
FIG. 5 is a block diagram of a general information handling system.

As shown in FIG. 5, an information handling system 500, such as remote management station 104 or server 106, can include a first physical processor 502 coupled to a first host bus 504 and can further include additional processors generally designated as $n^{th}$ physical processor 506 coupled to a second host bus 508. The first physical processor 502 can be coupled to a chipset 510 via the first host bus 504. Further, the $n^{th}$ physical processor 506 can be coupled to the chipset 510 via the second host bus 508. The chipset 510 can support multiple processors and can allow for simultaneous processing of multiple processors and support the exchange of information within information handling system 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between first physical processor 502 and the $n^{th}$ physical processor 506. For example, the chipset 510, including an AHA enabled-chipset, can include a memory controller hub and an input/output (I/O) controller hub. As a memory controller hub, the chipset 510 can function to provide access to first physical processor 502 using first bus 504 and $n^{th}$ physical processor 506 using the second host bus 508. The chipset 510 can also provide a memory interface for accessing memory 512 using a memory bus 514. In a particular embodiment, the buses 504, 508, and 514 can be individual buses or part of the same bus. The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 510. The chipset 510 can also be packaged as an application specific integrated circuit (ASIC).

The information handling system 500 can also include a video graphics interface 522 that can be coupled to the chipset 510 using a third host bus 524. In one form, the video graphics interface 522 can be an Accelerated Graphics Port (AGP) interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The information handling system 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a Peripheral Component Interconnect (PCI) bus or a high speed PCI-Express bus. In one embodiment, a PCI bus can be operated at approximately 43 MHz and a PCI-Express bus can be operated at more than one speed, such as 2.5 GHz, 5 GHz, 8 GHz, and 16 GHz. PCI buses and PCI-Express buses can be provided to comply with industry standards for connecting and communicating between various PCI-enabled hardware devices. Other buses can also be provided in association with, or independent of, the I/O bus 520 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the $n^{th}$ physical processor 506. The chipset 510 can also include a Southbridge portion (not illustrated) of the chipset 510 and can handle I/O functions of the chipset 510. The Southbridge portion can manage the basic forms of I/O such as Universal Serial Bus (USB), serial I/O, audio outputs, Integrated Drive Electronics (IDE), and ISA I/O for the information handling system 500.

The information handling system 500 can further include a disk controller 532 coupled to the I/O bus 520, and connecting one or more internal disk drives such as a hard disk drive (HDD) 534 and an optical disk drive (ODD) 536 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 510, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a management controller including a universal serial bus hub and first and second devices, the management controller to assign the first device to a first server node, to assign the second device to a second server node, and to create a routing table associated with the assignment of the first and second devices respectively to the first and second server nodes, wherein the first and second server nodes are only aware of the universal serial bus hub for communication with the management controller; and
   a router in communication with the management controller, the router to receive the routing table from the management controller, to receive data from the first server node, and to route the data to the first device based on the routing table, wherein the universal serial bus hub communicates with the router via a single physical port of the management controller.

2. The information handling system of claim 1 wherein the management controller further includes a service processor, the service processor to receive a request to assign the first device to the first server node.

3. The information handling system of claim 2 wherein the request is received in the service processor via a remote user initiated transaction.

4. The information handling system of claim 1 wherein the management controller further includes a service processor, the service processor to determine an assignment of the first device to the first server node, and to assign the first device to the first server node in the routing table.

5. The information handling system of claim 2 wherein the request is received in the service processor via a command from the first server node.

6. The information handling system of claim 1 wherein the router merges data from the first and second server nodes into a single stream that is transmitted to the universal serial bus hub via the single physical port.

7. The information handling system of claim 1 wherein the first and second device are virtual universal serial bus devices within the management controller.

8. An information handling system comprising:
   first and second server nodes each including a host controller;
   a management controller including first and second devices, the management controller to assign the first device to the first server node, to assign the second device to the second server node, and to create a first packet to send data from the first device to the first server node, the first packet including a header including header fields, and a first payload having a destination port identification and a first embedded payload; and
   a router in communication with the server nodes and with the management controller, the router to receive the first packet from the management controller, to deconstruct the first payload of the first packet, and to create a second packet including the header and the first embedded payload of the first packet, and to send the second packet to the first server node via a first port of the router based on the destination port identification in the first packet.

9. The information handling system of claim 8 wherein the router is further configured to receive a third packet from the second server node, the third packet including a second payload having data for the second device, to determine a second port of the router as a source port for the third packet, to create a fourth packet, the fourth packet including a third payload having the second payload as a second embedded payload and a source identification to identify the second port, and to send the fourth packet to the management controller.

10. The information handling system of claim 9 wherein the router merges the fourth packet with packets from the first server node into a single stream that is sent to the management controller via a single communication bus between the router and the management controller.

11. The information handling system of claim 8 wherein the first and second device are virtual universal serial bus devices within the management controller.

12. The information handling system of claim 8 wherein the first and second server nodes are processors within the information handling system.

13. The information handling system of claim 8 wherein the first and second server nodes are separate servers within the information handling system, and wherein each of the first and second servers includes one or more processors.

14. A method comprising:
   receiving, at a router, a routing table from a management controller, wherein the routing table is received via a sideband communication;
   receiving, at the router, a first packet from a universal serial bus hub of the management controller;
   determining a universal serial bus function from which the first packet is sourced;
   transmitting the first packet to a first host controller of a first server node based on the universal serial bus function from which the first packet is sourced and based on the routing table;
   receiving a second packet from the first host controller of the first server node and a third packet from a second host controller of a second server node;

merging the second and third packets into a single stream; and transmitting the single stream to the universal serial bus hub.

15. The method of claim 14 further comprising:

transmitting a hold packet to the second host controller of the second server node in response to the second host controller transmitting a number of packets that exceeds a threshold number packets during a specific period of time.

16. The method of claim 14 wherein the second and third packets are merged into the single stream based on a time division algorithm.

17. The method of claim 14 wherein the router is in communication with the universal serial bus hub via a single physical port of the management controller.

18. The method of claim 14 wherein the routing table is received from the management controller via a sideband channel.

19. The method of claim 14 wherein the first and second server nodes are processors within the information handling system.

20. The method of claim 14 wherein the first and second server nodes are separate servers within the information handling system, and wherein each of the first and second servers includes one or more processors.

* * * * *